(12) United States Patent
Maaref et al.

(10) Patent No.: US 9,521,555 B2
(45) Date of Patent: Dec. 13, 2016

(54) SYSTEM AND METHOD FOR CONFIGURING A COMMUNICATIONS NETWORK

(71) Applicant: Huawei Technologies Co., Ltd., Shenzhen (CN)

(72) Inventors: Amine Maaref, Kanata (CA); Ying Qian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 14/615,708

(22) Filed: Feb. 6, 2015

(65) Prior Publication Data

US 2015/0156634 A1    Jun. 4, 2015

Related U.S. Application Data

(62) Division of application No. 13/479,186, filed on May 23, 2012, now Pat. No. 8,971,818.

(51) Int. Cl.
| | |
|---|---|
| *H04W 72/00* | (2009.01) |
| *H04W 16/10* | (2009.01) |
| *H04W 24/02* | (2009.01) |
| *H04W 88/10* | (2009.01) |

(52) U.S. Cl.
CPC ............ *H04W 16/10* (2013.01); *H04W 24/02* (2013.01); *H04W 88/10* (2013.01)

(58) Field of Classification Search
CPC ...................................................... H04B 17/00
USPC .................................... 455/67.11, 501, 552.1
See application file for complete search history.

(56) References Cited

U.S. PATENT DOCUMENTS

| | | | |
|---|---|---|---|
| 7,848,782 B2 | 12/2010 | Berkowitz et al. | |
| 8,095,139 B2 * | 1/2012 | Marinier ............. | H04W 52/343 455/446 |
| 8,165,098 B2 * | 4/2012 | Teo ...................... | H04L 5/0037 370/335 |
| 2006/0068715 A1 | 3/2006 | Hundal et al. | |

(Continued)

FOREIGN PATENT DOCUMENTS

CN          101420699 A      4/2009

OTHER PUBLICATIONS

Au-Yeung, C.K., et al., "Opportunistic Cell Edge Selection in Multi-Cell OFDMA Networks," IEEE Globecom Dec. 2009 proceedings, 6 pages.

(Continued)

*Primary Examiner* — Charles Appiah
*Assistant Examiner* — Randy Peaches
(74) *Attorney, Agent, or Firm* — Slater Matsil, LLP

(57) ABSTRACT

A method for partitioning a communications network includes selecting, by a controller, a starting communications controller for a first region in the communications network according to an interference level. The method also includes including, by the controller, a first neighboring communications controller in the first region if an average inter-cell interference level of the starting communications controller and the first neighboring communications controller exceeds a first threshold and closing the first region if the average inter-cell interference level of the starting communications controller and the first neighboring communications controller fails to exceed the first threshold. The method further includes storing information about the first region in a memory.

20 Claims, 12 Drawing Sheets

(56) References Cited

U.S. PATENT DOCUMENTS

2007/0242647 A1 10/2007 Bennett
2013/0107929 A1* 5/2013 Ma .................. H04W 72/08
                                                    375/225

OTHER PUBLICATIONS

International Search Report received in Patent Cooperation Treaty Application No. PCT/CN2012/079080, dated Feb. 28, 2013, 12 pages.
Lu, Z., et al., "An Admission Control Strategy for Soft Frequency Reuse Deployment of LTE Systems," IEEE CCNC Jan. 2010 proceedings, 5 pages.
Mao, X., et al., "Adaptive Soft Frequency Reuse for Inter-cell Interference Coordination in SC-FDMA based 3GPP LTE Uplinks," IEEE Globecom Nov.-Dec. 2008 proceedings, pp. 1-6.
Porjazoski, M., "Analysis of Intercell Interference Coordination by Fractional Frequency Reuse in LTE," Softcom, Sep. 2010, 5 pages.
Simonsson, A., "Frequency Reuse and Intercell Interference Co-ordination in E-UTRA," IEEE, Apr. 2007, pp. 3091-3095.

* cited by examiner

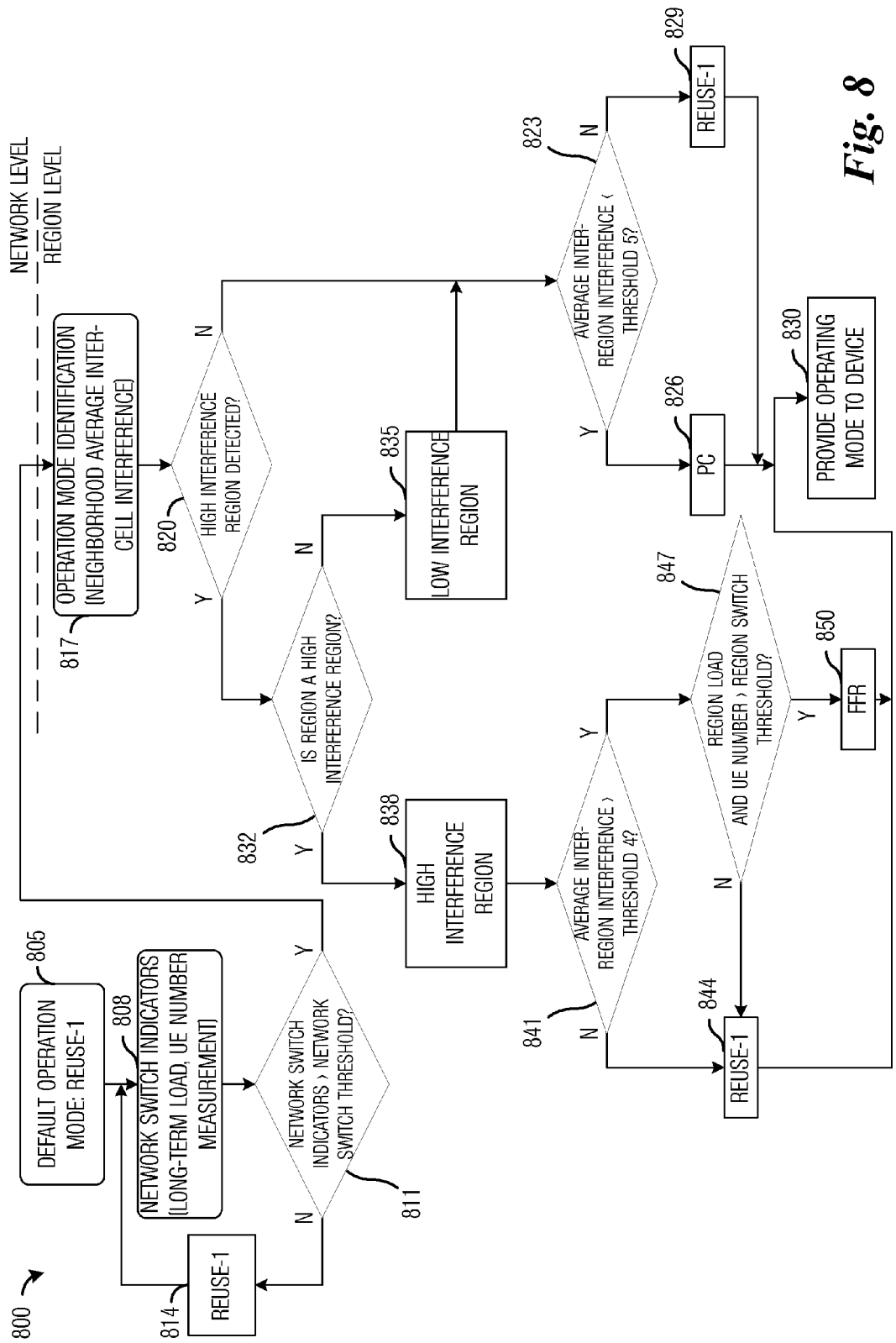

SYSTEM AND METHOD FOR CONFIGURING A COMMUNICATIONS NETWORK

This application is a divisional of U.S. patent application Ser. No. 13/479,186, entitled "System and Method for Configuring a Communications Network," filed on May 23, 2012, which application is hereby incorporated herein by reference.

TECHNICAL FIELD

The present disclosure relates generally to digital communications, and more particularly to a system and method for configuring a communications network.

BACKGROUND

Inter-cell interference (ICI) may be considered to be interference at a cell due to transmissions originating in another cell. Usually, ICI occurs between adjacent cells of a communications network. As an example, relatively high-powered transmissions to and from a cell edge user (CEU) operating in a first cell may cause more interference to adjacent cells utilizing the same operating frequency than relatively lower-powered transmissions to and from a cell center user (CCU) operating in the first cell to adjacent cells utilizing the same operating frequency due to correspondingly higher power levels of the transmissions to and from the CEU.

FIG. 1 illustrates a prior art communications network 100. Communications network 100 includes a first evolved NodeB (eNB) 105 and a second eNB 115. An eNB (also commonly referred to as a base station, communications controller, NodeB, and so forth) may be in communication with User Equipment (UE) operating within its coverage area. For example, eNB 105 may have a coverage area illustrated in FIG. 1 as hexagon 110, while eNB 115 may have a coverage area illustrated as hexagon 120. The coverage area of an eNB may also be commonly referred to as a cell or cells if the coverage area has been partitioned. Operating within hexagon 110 may be a first UE 125 and a second UE 130. A UE may also be commonly referred to as a mobile station, user, terminal, subscriber, wireless node, and so on.

A coverage area of an eNB (or more generally, a cell of an eNB) may be categorized based upon a distance to the eNB. For example, coverage area of eNB 105 (i.e., hexagon 110) may be categorized into two regions, with a first region being a cell center region (shown as circle 135) and a cell edge region (portions of hexagon 110 outside of circle 135, shown as region 140). Normally, with downlink fractional frequency reuse (FFR) inter-cell interference coordination (ICIC), UEs operating within a cell center region, such as UE 125, may receive transmissions made at a lower power level than UEs operating outside of a cell center region, such as UE 130, due to their closer proximity to the eNB serving the coverage area.

As indicated above, one form of ICIC is FFR ICIC. In FFR ICIC, available time and/or frequency resources (or simply resources) may be divided into multiple parts. The parts may be allocated to different transmitters. The allocation of the parts may be commonly referred to as a FFR pattern or frequency reuse pattern. Typically, in downlink transmissions, an eNB may be referred to as a transmitter, while in uplink transmissions, a UE may be referred to as a transmitter. The transmitters may then transmit only during times and/or in frequencies associated with their allocated time and/or frequency part(s), or transmit with different power densities in different time and/or frequency parts according to a predefined power density mask. Assignment of the time and/or frequency parts may be made so that adjacent and/or close transmitters cause little or no interference to one another and/or receivers. As an example, adjacent transmitters may be assigned different time and/or frequency part(s) so that their transmissions do not overlap either in time and/or frequency.

The FFR ICIC technique used may be referred by the number of parts that the available resources are divided into. As an example, FFR with Reuse-2 (or simply Reuse-2) would divide the available resources into two parts that may be assigned to transmitters in an attempt to reduce interference. Similarly, FFR with Reuse-3 (or simply Reuse-3) would divide the available resources into three parts, while FFR with reuse-1 (or simply Reuse-1) would not divide the available resources at all and may be indicative of non-FFR operation.

Soft frequency reuse (SFR) is another ICIC technique. In SFR, available resources are divided into a cell edge portion and a cell center portion. Additionally, UEs are classified as cell edge UEs (CEU) and cell center UEs (CCU). CEUs may be restricted to the cell edge portion of the resources, while the CCUs may be restricted to the cell center portion of the resources as well as lower priority access to the cell edge portion of the resources.

SUMMARY OF THE DISCLOSURE

Example embodiments of the present disclosure which provide a system and method for configuring a communications network.

In accordance with an example embodiment of the present disclosure, a method for partitioning a communications network is provided. The method includes selecting, by a network device, a starting communications controller for a first region in the communications network according to an interference level. The method also includes including, by the network device, a first neighboring communications controller in the first region if an average inter-cell interference level of the starting communications controller and the first neighboring communications controller exceeds a first threshold and closing the first region if the average inter-cell interference level of the starting communications controller and the first neighboring communications controller fails to exceed the first threshold, and storing, by the network device, information about the first region in a memory.

In accordance with another example embodiment of the present disclosure, a method for setting an operating mode of a region is provided. The method includes identifying, by a network device, an interference classification of the region, and setting, by the network device, the operating mode of the region according to the interference classification of the region, an inter-cell interference metric of the region, and an inter-region interference metric of the region. The method also includes providing, by the network device, the operating mode of the region to a device in the region.

In accordance with another example embodiment of the present disclosure, a network device is provided. The network device includes a processor. The processor selects a starting communications controller for a first region in a communications network according to an interference level, includes a first neighboring communications controller in the first region if an average inter-cell interference level of the starting communications controller and the first neighboring communications controller exceeds a first threshold and closing the first region if the average inter-cell interference level of the starting communications controller and the first neighboring communications controller fails to exceed the first threshold, and stores information about the first region in a memory.

In accordance with another example embodiment of the present disclosure, a network device is provided. The network device includes a processor. The processor identifies an interference classification of a region, sets an operating mode of the region according to the interference classification of the region, an inter-cell interference metric of the region, and an inter-region interference metric of the region, and provides the operating mode of the region to a device in the region.

One advantage of an embodiment is that regions in the communications network requiring different operating modes are identified, thereby permitting the selection of an operating mode for the different regions. The use of different operating modes tailored to the conditions of the individual regions help to improve overall communications network performance.

A further advantage of an embodiment is that the techniques presented herein may be implemented in a centralized manner or a distributed manner, which may enable a degree of flexibility in deployment.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 8 illustrates an example flow diagram of network device operations in operating mode self-adaptation according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to configuring a communications network. For example, a network device (which may be Operations and Support System (OSS) and/or an eNB) partitions a communications network into regions by selecting a starting communications controller and then including a neighboring communications controller to a region that includes the starting communications controller if an average inter-cell interference level of the starting communications controller and the neighboring communications controller exceeds a threshold. The network device closes the region if the average inter-cell interference level of the starting communications controller and the neighboring communications controller fails to exceed the threshold. As another example, a network device sets an operating mode for a region by identifying an interference classification of the region and then setting the operating mode for the region according to the interference classification, as well as an inter-cell interference metric of the region and an inter-region interference metric of the region.

The present disclosure will be described with respect to example embodiments in a specific context, namely a wireless communications network that supports multiple communications controllers or cells. The disclosure may also be applied, however, to standards compliant communications networks, such as those that are The Third Generation Partnership Project (3GPP) Long Term Evolution (LTE), 3GPP LTE-Advanced, IEEE 802.16m, WiMAX, and the like, compliant, as well as non standards compliant communications networks that support multiple communications controllers or cells.

Figure 1:
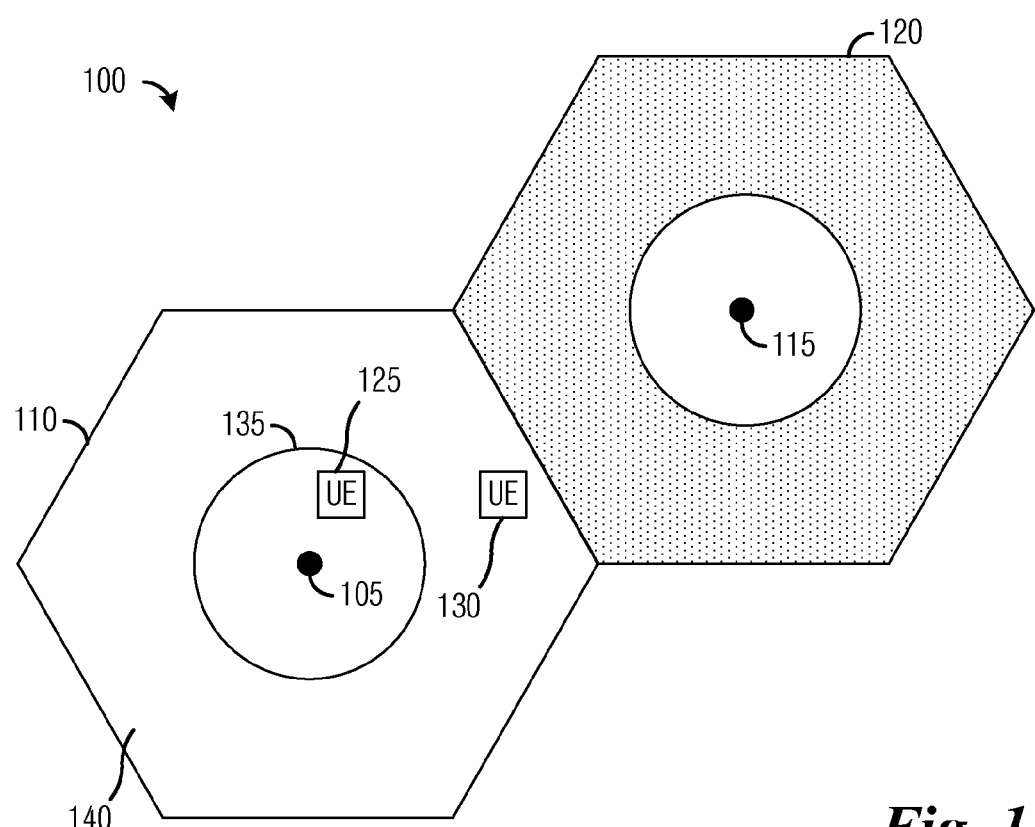
FIG. 1 illustrates a prior art communications network.
Figure 2A:
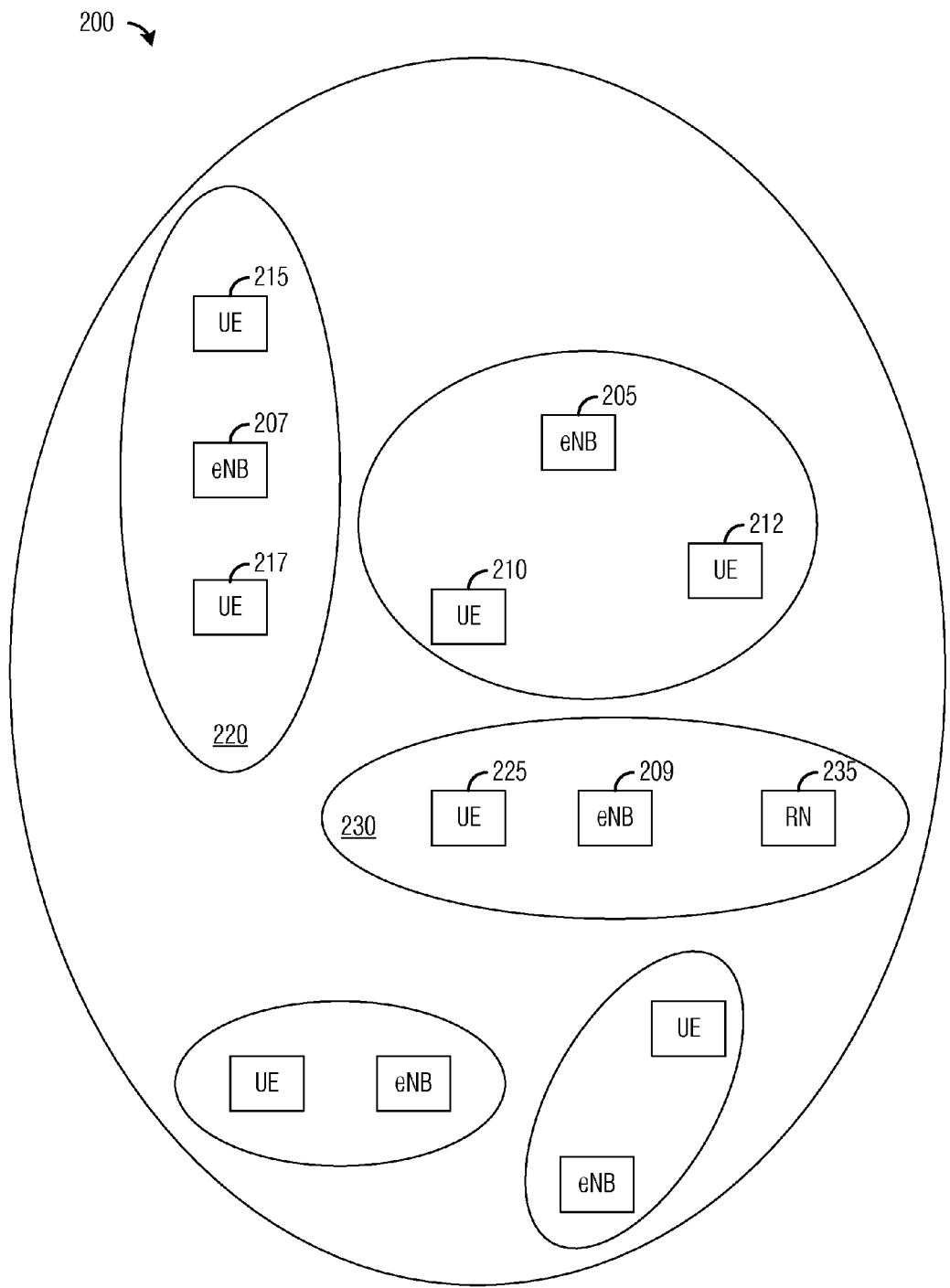
FIG. 2a illustrates an example communications network according to example embodiments described herein.

FIG. 2a illustrates a communications network 200. Communications network 200 includes a plurality of eNBs, such as eNB 205, eNB 207, and eNB 209. The eNBs in communications network 200 serve UEs operating within their coverage area. It is noted that the coverage area of an eNB may be referred to as a cell. In some situations, the coverage area of an eNB may be partitioned, such as through the use of sectorized antennas. In such a situation, the coverage area may be said to be partitioned into multiple cells. As an example, a commonly used partitioning of a coverage area is to partition the coverage area into three cells. It is also noted that another common use of the term cell may actually be to use the term cell to refer to the eNB that is serving the coverage area. As used herein, cell refers to coverage area.

As shown in FIG. 2a, eNB 205 serves UE 210 and UE 212, while eNB 207 serves UE 215 and UE 217 in its coverage area 220, and eNB 209 serves UE 225 in its coverage area 230. In addition to UEs, the eNBs may also serve relay nodes (RNs), which may be used to help improve coverage and overall communications network performance. As shown in FIG. 2a, eNB 209 serves RN 235. The eNBs in communications network 200 may have different capabilities. For example, some of the eNBs may be macro eNBs, which may also be referred to as full power eNBs, while others may be pico eNBs and/or femto eNBs, which are reduced power eNBs.

Depending upon an eNB's location and capability, as well as its proximity to other eNBs and their capabilities, the eNB's interference environment (or interference classification) may differ significantly from other eNBs in communications network 200. As an example, an eNB that is close to a number of macro eNBs serving a large number of UEs and/or RNs may have a high interference environment, while an eNB that is not close to any other eNBs or close to a few eNBs that are serving a small number of UEs and/or RNs may have a medium and/or low interference environment. Examples of interference classifications include interference limited, noise limited, high interference, medium interference, low interference, and the like.

Since some eNBs may be operating in an interference dominated environment where interference from transmissions of other eNBs and UEs negatively impact the performance of these eNBs and their UEs, while other eNBs may not be operating in an interference dominated environment, a single operating mode selected for all of the eNBs in a communications network, such as communications network 200, may not produce the best performance for all of the eNBs in the communications network.

Figure 2B:
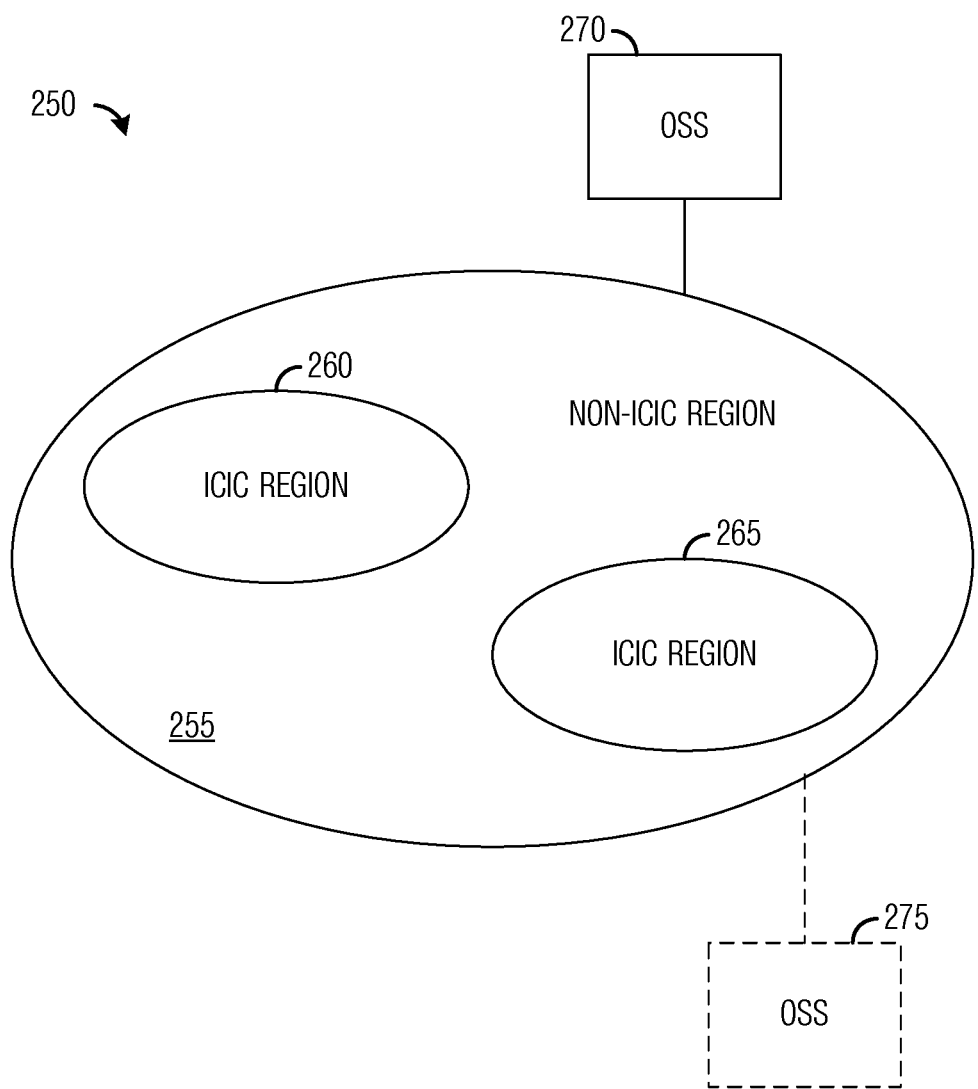
FIG. 2b illustrates an example communications network, wherein different regions of communications network operate in different modes according to example embodiments described herein.

FIG. 2b illustrates a communications network 250, wherein different regions of communications network 250 operate in different modes. Communications network 250 includes a plurality of regions, including region 255, region 260, and region 265. The different regions of communications network 250 may operate in different modes, such as non-ICIC mode wherein inter-cell interference coordination is not performed, which may mean that the transmitters within such a region transmit without concern for interference inflicted upon other devices. The support of different operating modes may permit the coexistence of interference limited regions and noise-limited regions. The regions may be automatically determined by a centralized entity or manually defined by an operator of the communications network. While other regions may operate in an ICIC mode, such as FFR, SFR, power control, coding, and the like. As shown in FIG. 2b, region 255 may operate in the non-ICIC mode, while regions 260 and 265 may operate in an ICIC mode. It is noted that the ICIC mode of regions 260 and 265 may be the same ICIC mode or different ICIC modes.

The operating mode of regions in communications network 250, as well as the regions themselves, may be determined by an OSS 270 or based on information generated by OSS 270. As an example, in a centralized implementation of operating mode determination, OSS 270 may generate information, such as neighbor information about eNBs and their neighbors, interference information, and the like, to determine the regions in communications network 250 and the operating mode of the regions. As another example, in a distributed implementation of operating mode determination, OSS 270 may generate the information and the regions, while the eNBs within the regions may determine their own operating mode. As yet another example, in another distributed implementation of operating mode determination, OSS 270 may generate the information, while the eNBs in communications network 250 may generate the regions and determine their own operating mode. In general, OSS 270, as well as other OSS, and eNBs, may be referred to as network devices.

As shown in FIG. 2b, communications network 250 may include a plurality of OSS, such as OSS 270 and OSS 275. As an example, each OSS may be used to determine operating modes for regions of a different part of communications network 250. As another example, each OSS may be used to determine operating modes for regions of communications network 250 and the results may be shared to check if similar results are produced by the different OSS.

Figure 3:
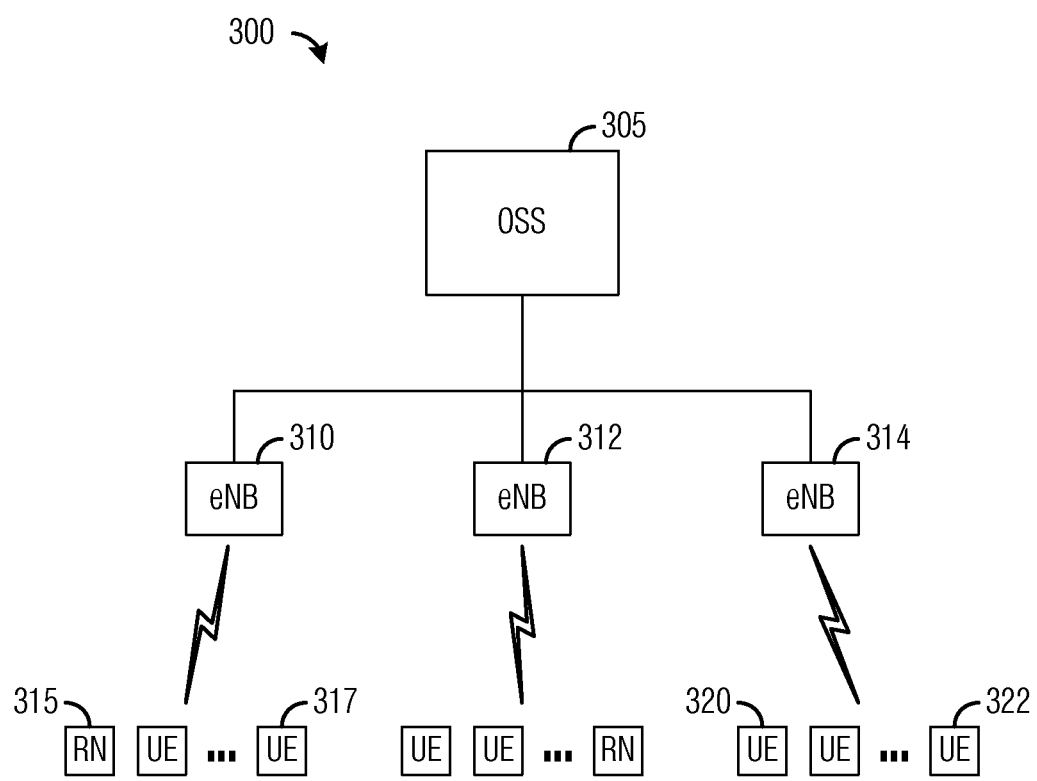
FIG. 3 illustrates an example hierarchical view of a communications network according to example embodiments described herein.

FIG. 3 illustrates a hierarchical view of a communications network 300. Communications network 300 is shown in FIG. 3 in a hierarchical manner. An OSS 305 may be responsible for operations and support for a plurality of eNBs, such as eNB 310, eNB 312, and eNB 314. Each eNB may serve a plurality of communications devices, such as UEs and/or RNs. As shown in FIG. 3, eNB 310 may serve RN 315 and UEs, such as UE 317, while eNB 314 may serve UEs, such as UE 320 and UE 322. Although shown in FIG. 3 as having only one OSS, communications network 300 may include one or more OSS.

Figure 4:
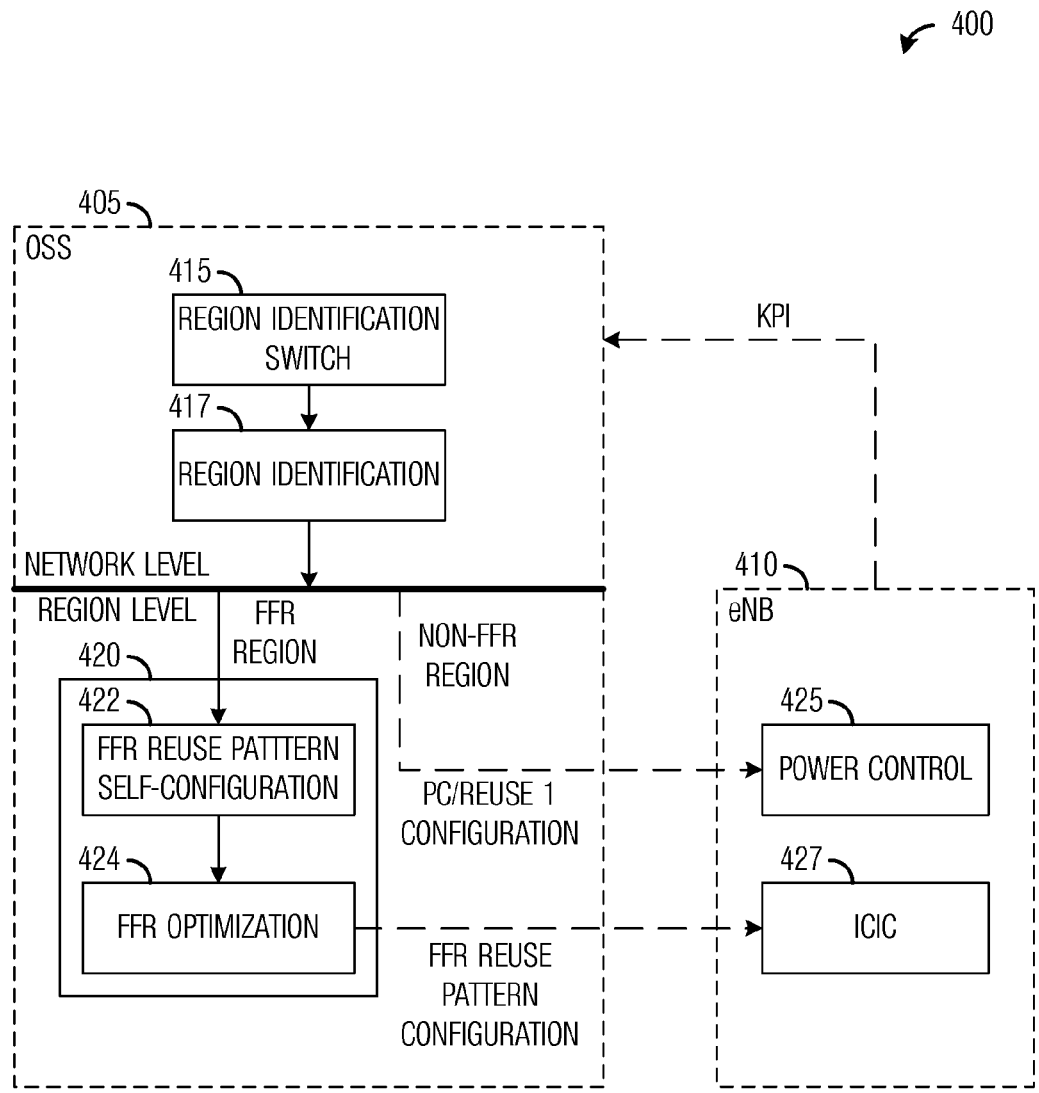
FIG. 4 illustrates an example detailed view of a portion of a communications network highlighting example operations involved in operating mode selection according to example embodiments described herein.

FIG. 4 illustrates a detailed view of a portion of a communications network 400 highlighting example operations involved in operating mode selection. Communications network 400 includes an OSS 405 and an eNB 410. A number of issues relating to ICIC operation control and automatic region identification include: a) ICIC operation control aims to optimize ICIC gain while minimizing potential losses that may arise due to incorrect operation mode selection; and b) Automatic identification of highly interference-limited regions that may benefit from ICIC.

Example operations involved in operating mode selection include, at a network level, OSS 405 may perform region identification switch 415 which may be responsible for switching communications network 400 from non-ICIC operation to ICIC operation and vice versa. Region identification switch 415 may perform and/or control a three level ICIC switch that includes a static network level switch, a semi-static OSS based cell level switch, as well as a dynamic eNB based cell level switch. Some switch indicators include: (i) a UE number based ICIC switch indicator that may be set to true if a number of dense cells in communications network 400 is above a pre-defined dense cell threshold, (ii) a network loading based ICIC switch indicator that may be set to true if a number of non-lightly loaded cells is above a pre-defined non-lightly loaded threshold and (iii) an interference based ICIC switch indicator that may be set to true if a number of conflict pairs in the network is above a predefined conflict pairs threshold. However, it may be possible to eliminate the interference based network level switch indicator to remove the neighborhood based conflict pairs threshold.

OSS 405 may also perform region identification 417 which may be responsible for identifying regions in communications network 400 that are highly interference-limited and those that are not. Region identification 417 may also be responsible for generating the regions of communications network 400. Region identification 417 may also select the operating modes of the regions of communications network 400.

While at a region level, for non-FFR operation in regions that are not highly interference-limited, OSS 405 may perform power control (PC) and/or Reuse-1 configuration, which may be assigned to eNB 410. For FFR operation in regions that are highly interference-limited, OSS 405 may perform ICIC 420, which includes FFR reuse pattern self-configuration 422 and FFR optimization 424. FFR reuse pattern self-configuration 422 may include resource partitioning and/or allocation to transmitters in communications network 400 in a manner which helps to reduce inter-cell interference. Noise limited cells may no longer need to be separately identified in FFR reuse pattern self-configuration 422. FFR optimization 424 may include selection and/or optimization of FFR reuse patterns as well as other configuration parameters over time according to conditions of communications network 400. FFR operation may make use of neighbor information generated by OSS 405. It is noted that the discussion of OSS 405 performing ICIC 420 focuses on FFR being an example of ICIC operation. However, other forms of ICIC operation may be performed by OSS 405, including SFR, and the like. FFR may be an example of a number of different ICIC techniques and should not be construed as being limiting to either the scope or the spirit of the disclosure.

At eNB 410, transmit power levels of eNB 410 as well as communications devices served by eNB 410 may be specified by power control 425 if eNB 410 is operating in a non-FFR region. Power control 425 may perform self-adaptive multilevel downlink power control scheme suitable for noise-limited scenarios. The transmit power levels may be determined by PC and/or Reuse-1 configuration information provided by OSS 405. eNB 410 may also perform ICIC 427 according to FFR reuse pattern configuration information provided by OSS 405 if eNB 410 is operating in a FFR region. As in the above discussion of OSS 405, the discussion of eNB 410 focuses on eNB 410 performing FFR as an example of ICIC operation. Instead of FFR, eNB 410 may utilize other ICIC techniques, such as SFR, and the like.

eNB 410 may provide key performance indicators (KPI) to OSS 405, which may be used by OSS 405 to adjust the operation of communications network 400, which may involve adjustments to region identification switch 415, region identification 417, ICIC 420, and the like. Examples of KPI include long term statistical information, including resource block utilization rate, number of active UEs (e.g., a number of UEs to be scheduled), UE distribution information, handover performance, communications network load, downlink throughput, downlink coverage, and the like.

In general, FFR, SFR, and power control (e.g., downlink power control) are different techniques aimed at improving coverage performance under interference-limited and noise-limited scenarios, respectively. In FFR, SFR, and power control, the transmit power level of transmissions for the cell edge UEs (CEU) may be boosted at the expense of lowering the transmit power level afforded to cell center UEs (CCU). Typically, FFR and SFR may coordinate a transmit power density between neighboring cells so that different color modes are allocated to neighboring cells. FFR and SFR may provide coverage gain owing to the power boost for CEU and less interference from immediate neighboring cells. It may restrict scheduling flexibility, especially for CEUs, under frequency selective scheduling (FSS), and may fail to capitalize on the power amplifier's maximum transmit power. Therefore, the performance in noise-limited scenarios may be affected. No such restrictions are observed for UE-centric power control, where no coordination between cells is required, which makes power control more suitable for indoor noise-limited scenarios, whereas FFR and SFR are generally more suitable for interference-limited scenarios. Therefore, power control can take advantage of the more stable inter-cell interference pattern. An aspect of self-organizing network (SON) ICIC is the ability to automatically determine which cells in the network should operate using FFR and SFR and those who would rather operate using power control in order to leverage the strengths of both schemes effectively.

A modification to a neighbor relationship table (NRT) calculation may be made by applying a threshold on a maximum reference signal received power (RSRP) report received by a UE who enters into an operating mode in order to distinguish interference-limited from noise-limited UEs. The noise-limited UEs bear less impact on the NRT evaluation as can be inferred from the following example NRT definition expressible as $$A_{ij} = \frac{1}{N_{RSRP}^{i}} \sum_{k=1}^{N_{RSRP}^{ij}} \frac{RSRP_{k}^{j}}{RSRP_{k}^{i}} I_{k}, \qquad (1)$$

where $$I_{k} = \begin{cases} 1, & \text{if } \max_{j} RSRP_{k}^{j} > \text{Threshold} \\ 0, & \text{otherwise} \end{cases}$$

where the NRT entry $A_{ij}$ reflects an estimation of the interference level imposed by cell j on cell i. The indicator function $I_k$ ensures that only reports by interference-limited UEs are accounted for in the NRT evaluation. It is noted that a normalization factor $N_{RSRP}^{i}$ does take into consideration all reports from all UEs in cell i whereas $N_{RSRP}^{ij}$ is the number of reports from UEs in cell i complaining about the interference received from cell j. It is noted that the example NRT definition shown in Equation (1) may be an example of multiple possible example NRT definitions.

Figure 5:
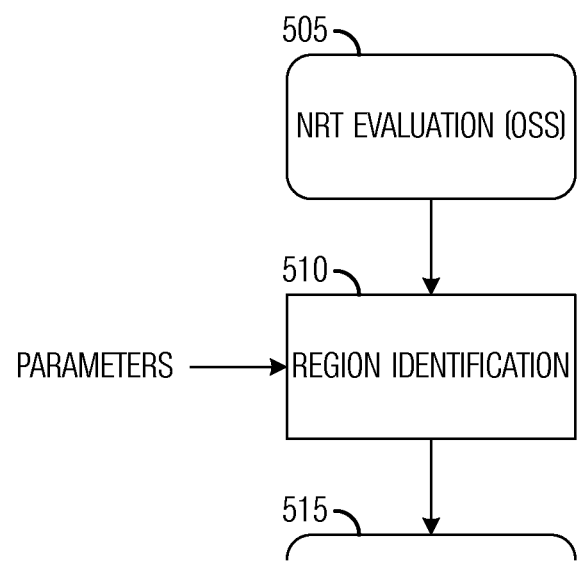
FIG. 5 illustrates an example high level flow chart of operations in a region identification algorithm according to example embodiments described herein.

FIG. 5 illustrates a high level flow chart of operations 500 in a region identification algorithm. Operations 500 may be indicative of operations occurring in an OSS, such as OSS 405, as the OSS automatically identifies regions in a communications network. Although the discussion of FIG. 5 focuses on the OSS performing the operations involved in the determination of the operating mode of regions in the communications network, the operations may also be performed in another network device in the communications network, such as an eNB, or in a combination of network devices, such as an OSS and an eNB.

Operations 500 may begin with the OSS evaluating a NRT (block 505). The NRT may be generated from information provided by eNBs in the communications network and/or global mutual relationship information determined by the OSS according to mutual relationship information from the eNBs. As an example, the NRT may provide information about eNBs, neighboring eNBs of the eNBs, interference inflicted to the eNB by its neighboring eNBs, interference inflicted to the neighboring eNBs by the eNB, and the like. The eNBs may report information, such as the mutual relationship information, RSRP reports, and the like, to the OSS. As an example, the eNBs may calculate their respective $A_{ij}$ and report it back to the OSS, which may then complete the evaluation of the NRT.

The OSS may identify regions in the communications network (block 510). The OSS may identify interference-limited regions, noise-limited regions, and the like, in the communications network according to the NRT. As an example, the OSS may have as input, parameters of the communications network, such as frequency band, available coding schemes, number of eNBs, position of the eNBs, and the like, and in conjunction with the NRT, identify interference-limited regions and noise-limited regions in the communications network. As another example, the OSS may identify regions by initially selecting starting points (e.g., eNBs) with high interference and placing each into its own region. The OSS may then add neighboring eNBs to the regions if the addition of the neighboring eNBs does not result in an interference metric dropping below a neighborhood expansion threshold. It is noted that neighboring eNBs may be classified according to layer, e.g., first layer neighbor, second layer neighbor, and the like. The addition of neighboring eNBs may proceed on a layer by layer basis. A detailed discussion of an example technique for identifying regions is provided below. From the regions of the communications network, the OSS may identify the eNBs that are interference-limited eNBs and eNBs that are noise-limited eNBs (block 515).

The region identification and/or the operating mode determination may make use of a variety of interference metrics. Inter-cell interference may be recast into a broader concept of region-based average interference, wherein a region may be described as a compact set comprising a number of eNBs in the communications network. Given a region $R_1$ comprised of a number of cells, and a second region $R_2$ comprised of a number of cells which may or may not overlap with cells in $R_1$, we define a regional average interference metric from $R_2$ relative to $R_1$ measuring the average inter-cell interference imposed by cells in $R_2$ upon cells in $R_1$ as $$I_{R_1 \leftarrow R_2} = \frac{1}{|R_1|} \Sigma_{i \in R_1} \Sigma_{j \in R_2} A_{ij}, \quad (2)$$

where $|R_1|$ denotes the cardinality of the set $R_1$, i.e. the number of cells in the set $R_1$.

An average inter-cell interference metric may be defined. Let $R_2$ be the whole network, then $I_{R_1 \leftarrow R_2}$ can be expressed as $$I_{R_1 \leftarrow R_2} := I_{R_1} = \frac{1}{|R_1|} \Sigma_{i \in R_1} \Sigma_j A_{ij} \quad (3)$$

which represents the average inter-cell interference relative to $R_1$.

An inter-cell interference metric may be defined. Furthermore, when $R_1$ consists of a single cell i, i.e., $R_1$ is the singleton $\{i\}$, then the regional average interference metric $I_{R_1}$ further collapses to $$I_{R_1 \leftarrow R_2}' = I_i = \Sigma_j A_{ij} \quad (4)$$

which is a measure of the inter-cell interference suffered by cell i. Thus the latter metric expressing inter-cell interference is indeed covered as a special case of the more general region-based average interference metric.

An average inter-region interference metric may be defined. Another special case of the region-based average interference metric is when regions $R_1$ and $R_2$ are non-overlapping. In such a case the regional average interference metric captures the notion of inter-region interference. For instance, when $R_2$ is the absolute complement of $R_1$, i.e. $R_2 = \overline{R_1}$, it may be possible to express $$I_{R_1 \leftarrow R_2} = I_{R_1 \leftarrow \overline{R_1}} = \frac{1}{|R_1|} \Sigma_{i \in R_1} \Sigma_{j \in \overline{R_1}} A_{ij}. \quad (5)$$

This instance of the regional average interference metric represents the average interference imposed by cells outside $R_1$ upon cells inside $R_1$ and therefore captures the average inter-region interference relative to $R_1$.

Figure 6A:
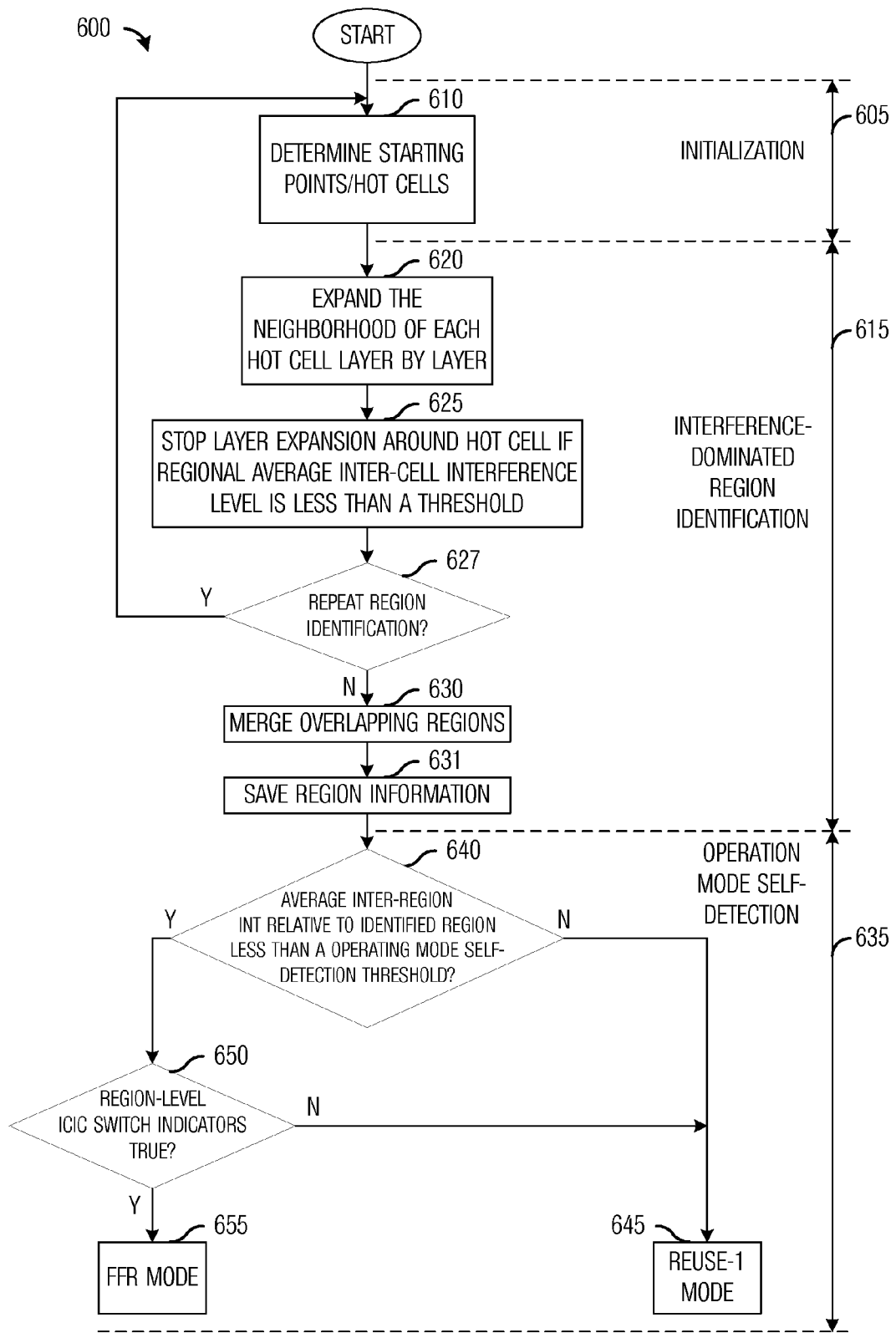
FIG. 6a illustrates an example flow diagram of network device operations in operating mode determination for regions of a communications network according to example embodiments described herein.

FIG. 6a illustrates a flow diagram of network device operations 600 in operating mode determination for regions of a communications network. Operations 600 may be indicative of operations occurring in an OSS, such as OSS 405, as the OSS determines the operating mode of regions of a communications network. Although the discussion of FIG. 6a focuses on the OSS performing the operations involved in the determination of the operating mode of regions in the communications network, the operations may also be performed in another network device in the communications network, such as an eNB, or in a combination of network devices, such as an OSS and an eNB.

Operations 600 may begin with an initialization phase 605 wherein the OSS may determine starting point(s) and/or hot cell(s) in the communications network (block 610). It is noted that starting point and hot cell may be used interchangeably. A starting point and/or a hot cell may also be referred to as a starting communications controller, and may be an eNB, such as eNB 205, eNB 207, eNB 209, and the like. Each starting point may be placed in a region. Typically, a starting point should be an eNB that suffers more interference than most other eNBs in the communications network. As an example, the starting point(s) may be chosen according to the inter-cell interference metric discussed previously. An example choosing of the starting point(s) may include a ranking of eNBs in the communications network according to the value of their inter-cell interference metric $I_i = \Sigma_j A_{ij}$ such that $I_1 > I_2 > I_3 > \ldots$ . Then, according to a starting point identification threshold, e.g., a first threshold, $T_1$, up to an integer number N eNBs may be chosen that satisfy expression $$I_i > T_1, \; i=1, \ldots, N.$$

As an alternative example, the starting point(s) may be selected manually.

In general, initialization phase 605 may involve the OSS ranking the eNBs of the communications network according to an inter-cell interference metric and then determining the starting point(s) according to the starting point identification threshold. As an example, a starting point may be an eNB whose inter-cell interference level is above the starting point identification threshold. An example value of the starting point identification threshold may be about 0.8, such as in a range between 0.7 to 0.9. It may be possible to determine a reasonable value for the starting point identification threshold from a cumulative distribution function (CDF) of received inter-cell interference metrics. As an example, a reasonable value for the starting point identification threshold may correspond to a value where the CDF of the received inter-cell interference metric approaches 100 percent. The selection of such a value for the starting point identification threshold may provide a suitable tradeoff between performance and implementation complexity. It is noted that the region identification technique has been shown to not be particularly sensitive to the position of the starting points and therefore, the starting point identification threshold. It is noted that a large number of starting points may result from a low value for the starting point identification threshold, while a high value for the starting point identification threshold may result in a small number of starting points.

Operations 600 may begin a region identification phase 615. Region identification phase 615 may include the expansion of the region(s) corresponding to the starting point(s) (block 620). The expansion of the region(s) may be performed automatically and asymmetrically to capture highly interfering eNBs in the vicinity of each starting point by adding, or similarly, including, the highly interfering eNBs into a region that includes the starting point. As an example, the OSS may perform a layer by layer neighborhood expansion around each of the starting point(s) according to the $A_{ij}$ inter-cell interference metric. The expansion around each of the starting point(s) may also be according to a neighborhood expansion threshold, e.g., a second threshold $T_2$. It is noted that the region identification algorithm converges to a stable region(s) as long as the starting point(s) includes a number of outdoor cells. Hence, example values of the neighborhood expansion threshold include values greater than or equal to 0.07.

The N eNBs chosen as the starting point(s) may be processed (region expansion performed on them) successively. The processing of the starting point(s) may start with the eNB which suffers the highest level of inter-cell interference. The processing may continue with each successive eNB of the starting point(s).

Neighboring eNBs may be identified according to their layer. As an example, a first layer neighbor of eNB i may be any eNB whose inter-cell interference level to eNB i, as estimated by the $A_{ij}$ metric, is above a certain threshold T. Let $R_0(i)=\{i\}$ be the singleton region consisting of eNB i. A first-layer neighborhood of $R_0(i)$, i.e., the set of eNBs j whose generated interference to eNB i is above the certain threshold T, may be expressed as $$N_{R_0(i)}=\{j|A_{ij}>T\}. \quad (6)$$

A first layer expansion around eNB i, $R_1(i)$, may be defined as the union set between $R_0(i)$ and the first-layer neighborhood of $R_0(i)$, i.e., $$R_1(i)=R_0(i)\cup N_{R_0(i)}. \quad (7)$$

For n>1, a n-th layer region expansion around eNB i may be recursively defined as the union set between the (n−1)th layer region expansion $R_{n-1}(i)$ and the set of first layer neighborhoods of all eNBs belonging to $R_{n-1}(i)$, i.e., $$R_n(i) = R_{n-1}(i) \cup \bigcup\nolimits_{k \in R_{n-1}(i)} R_1(k)$$
$$= R_{n-1}(i) \cup \{j \mid A_{kj} > T, k \in R_{n-1}(i)\}.$$

A first layer neighborhood of the expanded region $R_{n-1}(i)$ may be expressed as $$N_{R_{n-1}(i)}=\cup_{k\in R_{n-1}(i)}R_1(k)\backslash R_{n-1}(i), \quad (8)$$

where for two sets A and B, B\A denotes the relative complement of A in B. Per the discussion, $B=\cup_{k\in R_{n-1}(i)}R_1(k)$ may be the union set of all the first-layer expansions around eNB k where k is any eNB that belongs to the (n−1)th layer expansion around eNB i, $R_{n-1}(i)$, and $A=R_{n-1}(i)$. Accordingly, a n-th layer region expansion may be seen as the union set between the (n−1)th layer region expansion $R_{n-1}(i)$ and the first-layer of neighboring eNBs to the region $R_{n-1}(i)$, i.e., $$R_n(i)=R_{n-1}(i)\cup N_{R_{n-1}(i)}. \quad (9)$$

It is noted that for region expansion after the first layer neighbor may involve the selection of potential eNBs of all eNBs already in the region and not just the starting point of the region.

It is noted that $A_{ij}$ may be used as the underlying neighborhood expansion metric instead of $B_{ij}=A_{ij}+A_{ji}$. The use of $A_{ij}$ may allow the region identification algorithm enough flexibility by increasing its directivity in order to capture any asymmetry in interference-dominated regions. It is also noted that the first-layer neighborhood $R_1(i)$ includes the eNB i. It is also noted that the number of layers to be expanded is not preset. Instead, the number of layers may be determined automatically according to the outcome of the region identification phase.

Having sorted the starting point(s) from 1 to N in decreasing order of their respective inter-cell interference metrics, it may be possible to process them successively as per the above discussion. For starting point i where 1≤i≤N, a layer-by-layer region expansion aimed at identifying the interference-dominated region may be performed.

Prior to performing the (n+1)-th layer region expansion, the first-layer neighborhood $N_{R_n(i)}$ of region $R_n(i)$ may be identified. A decision may then be made on whether to add or place (or similarly, include) this new layer of neighbors into the interference-dominated region or to stop the region's expansion at a current layer n. As an example, the decision may hinge on comparing the average inter-cell interference $I_{R_{n+1}(i)}$ to a region identification threshold, e.g., a third threshold $T_3$. If $I_{R_{n+1}(i)}>T_3$, then the interference-dominated region may be expanded to account for the new layer of neighbors and the above neighborhood expansion process is repeated until the average inter-cell interference becomes less than the region identification threshold or there are no new neighbors to consider. As another example, the decision may hinge on comparing pair-wise inter-cell interference to the region identification threshold, then the interference-dominated region may be expanded to account for the new layer of neighbors and the above neighborhood expansion process is repeated until the pair-wise inter-cell interference becomes less than the region identification threshold or there are no new neighbors to consider. As another example, the inter-cell interference for subsets of eNBs of the region may be compared with the region identification threshold for purposes of region expansion.

Figure 6B:
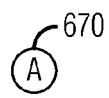
FIGS. 6b through 6e illustrate examples of region expansion according to example embodiments described herein.
Figure 6C:
Figure 6D:
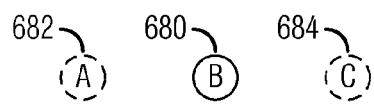
Figure 6E:
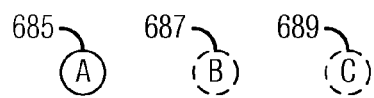

Referring now to FIGS. 6b through 6e, wherein examples of region expansion is highlighted. FIG. 6b illustrates a region including a starting point 670. FIG. 6c illustrates the addition or placing (or similarly, the inclusion) of an eNB 677 to a region that includes a starting point 675. FIG. 6d illustrates first layer neighbors (eNB 682 and eNB 684) of eNB 680. FIG. 6d illustrates a region comprising the union of a starting point 685 with its first layer neighbor eNB 687 and first layer neighbors of eNB 687 (eNB 689).

Referring back to FIG. 6a, in general, FFR gain may be due roughly to coordination among neighboring eNBs and given that FFR eNBs may not expect to receive favorable treatment from their non-FFR neighbors no matter what operating mode the non-FFR neighbors happen to be using (e.g., power control, Reuse-1, and the like), it may be logical that in order to reap the most benefit out of ICIC, an operation mode determination mechanism should ensure that an interference-dominated region's operating mode is set to FFR if its average inter-region interference metric is below an operation mode self-detection threshold, e.g., a fourth threshold $T_4$. An aim may be to guarantee that the combination of the FFR region's size and shape is suitable to effectively leverage the FFR gain, i.e., the number of FFR eNBs in an interference-dominated region is big enough relative to the number of non-FFR eNBs located at the border of the interference-dominated region.

Continuing with discussion of region identification phase 615, region expansion may be halted or closed, i.e., the addition of eNBs to the region(s) may be stopped, when the inter-cell interference metric corresponding to that region is less than the region identification threshold (block 625). The region expansion may also be halted if there are no more neighboring eNBs that generate sufficiently strong interference to eNBs in the region. It is noted that the inter-cell interference metric, e.g., the average inter-cell interference level, is normally a decreasing function of the number of layers. Generally, the majority of eNBs added to a region typically occur within the first two or three layers of the starting point. Hence, it may be possible to infer that an example of the region identification threshold be at or around 0.5, such as in a range from 0.4 to 0.6.

Region identification phase 615 may also include with the OSS performing a test to determine if the region expansion should be repeated (block 627). The regions may be re-determined if conditions change in the communications network. As an example, eNBs may be added or removed from the communications network, RNs may be added or removed from the communications network, UEs may move to different eNBs, time of the day, and the like, which may impact the load on the communications network and thereby change the interference environment of the communications network. As an example, the eNBs may report KPIs to the OSS, which may then determine if the region expansion should be repeated. The OSS may also determine that the region expansion may need to be repeated if error rates increase, which may indicate that the interference environment of the communications network has changed.

Region identification phase 615 may also include the OSS merging overlapping regions, if there are any (block 630). The merging of overlapping regions may involve the combining of the two or more overlapping regions into a single region that includes all of the eNBs in the two or more overlapping regions. As an example, consider a situation with a first region with eNBs A, B, C, and E and a second region with eNBs B, D, & F. The first region and the second region overlap at eNB B and may be merged into a combined region with eNBs A, B, C, D, E, and F. As another example, consider a situation with a first region with eNBs A, B, C, and E and a second region with eNBs B, D, & F and a third region with eNBs F, G, and H. The first region, the second region, and the third region may be merged into a combined region with eNBs A, B, C, D, E, F, G, and H. The OSS may save information about the regions into a memory, provide the information to the eNBs in the regions, and the like (block 631).

Operations 600 may begin an operating mode self-detection phase 635. Operating mode self-detection phase 635 may involve the OSS performing interference-limited region identification, as well as operating mode selection. A purpose of operation mode self-detection phase 635 may be to ensure that only interference-limited regions of a certain size and shape are set to operate in a FFR mode. The intuition behind this test stems from earlier observations that, roughly speaking, FFR gain is mostly due to the cooperation between neighboring eNBs. If the number of cooperating eNBs is too small or if the shape of the region is such that too many neighboring eNBs contribute to create interference onto the region then the region may not receive much benefit from performing ICIC and complexity may be reduced by operating the region in a Reuse-1 mode. The inter-region interference metric introduced previously may be used for operating mode selection. If the average inter-region interference relative to a merged interference-dominated region is less than the operating mode self-detection threshold, then the region may be likely to benefit from FFR operation. However, before adopting the FFR mode for the region, an additional check may be performed using a region-level load and a UE number ICIC switch indicators. As an example, the check may determine if the switch indicators are enabled.

Operating mode self-detection phase 635 may include the OSS performing a comparison of an average interference metric, such as an average inter-region interference level of a region with the operating mode self-detection threshold (block 640). The average interference metric, such as the average inter-region interference level, may provide an indication of the interference environment of the region and may be used to select an operating mode for the region. As an example, the operating mode self-detection threshold may be set at a value lower than 0.05, such as at or around 0.015, such as a range from 0.005 to 0.045. It may be noted that the average inter-region interference level is a decreasing function of outdoor region size, e.g., in terms of a number of outdoor eNBs. Generally, as more eNBs are included in a region, a received out-of-region interference decreases and may be reflected by the inter-region interference level. It may be emphasized that the inter-region interference level characterizes not only the size of the region but also its shape. As an example, smaller regions, as well as regions of certain shape and/or form tend to not perform well when operating in the FFR operating mode. If the average inter-region interference level of the region is not less than the operating mode self-detection threshold (block 640), then the region may be set to operate in a Reuse-1 mode (block 645).

However, if the average inter-region interference level of the region is less than the operating mode self-detection threshold (block 640), then the OSS may perform an additional check to determine if a region level ICIC switch indicators are true (block 650). As an example, region level ICIC switch indicators include a region's load, as well as a number of UEs in the region. If the region level ICIC switch indicators are not true, then the region may be set to operate in a Reuse-1 mode. However, if the region level ICIC switch indicators are true, then the region may be set to operate in a FFR mode (block 655). It is noted that the operating mode for all of the regions in the communications network or a subset of all of the regions in the communications network may be set according to the average inter-region interference level.

Figure 7A:
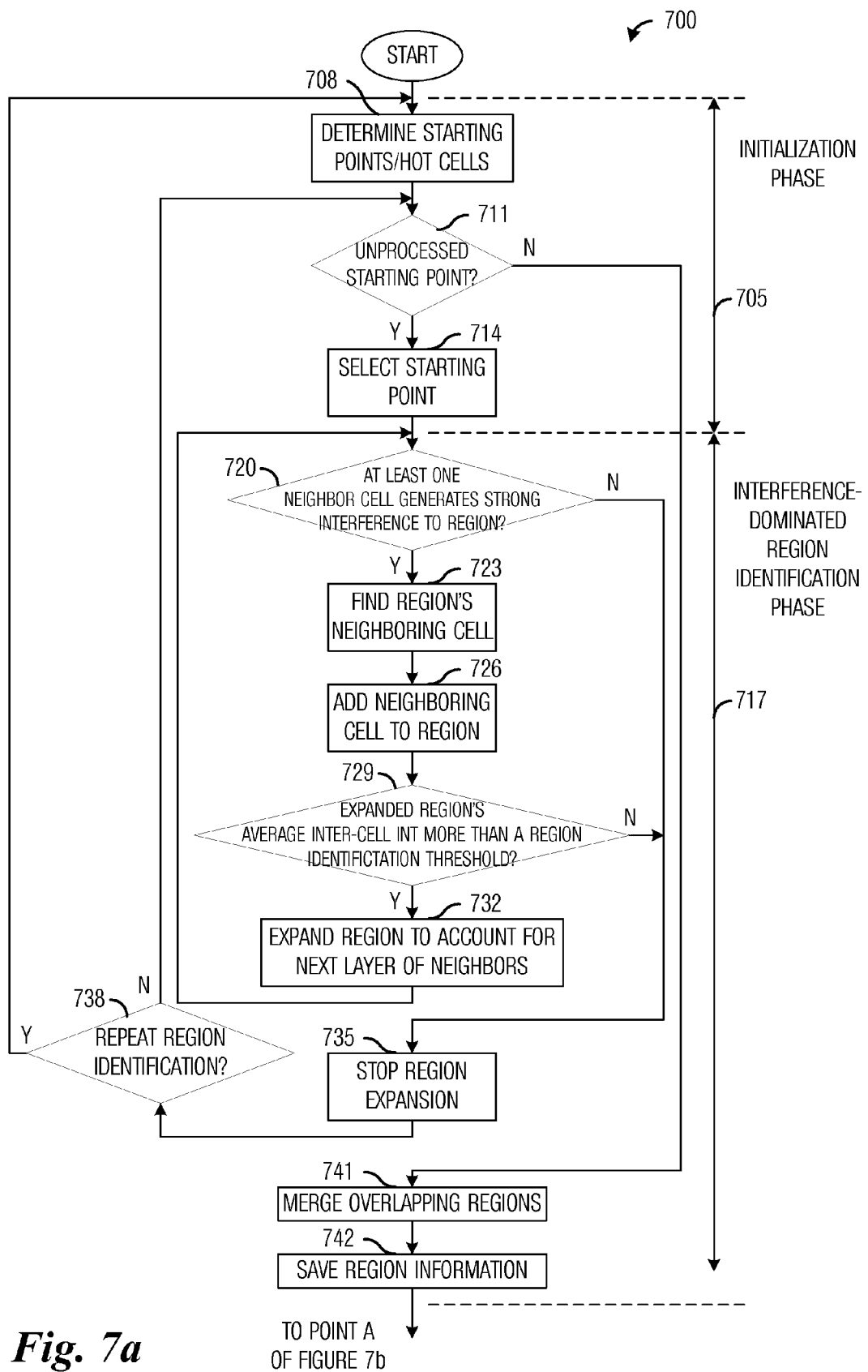
FIG. 7a illustrates an example flow diagram of detailed network device operations in operating mode determination for regions of a communications network, wherein an initialization phase and a region identification phase are highlighted according to example embodiments described herein.

FIG. 7a illustrates a flow diagram of detailed network device operations 700 in operating mode determination for regions of a communications network, wherein an initialization phase and a region identification phase are highlighted. Operations 700 may be indicative of operations occurring in an OSS, such as OSS 405, as the OSS determines the operating mode of regions of a communications network. Although the discussion of FIG. 7a focuses on the OSS performing the operations involved in the determination of the operating mode of regions in the communications network, the operations may also be performed in another network device in the communications network, such as an eNB, or in a combination of network devices, such as an OSS and an eNB.

An initialization phase 705 may include the OSS determining a starting point(s) of the communications network (block 708). The OSS may perform a check to determine if there are any starting point(s) that have not been processed for region expansion (block 711). If there are no more starting point(s) that have not been processed, then the OSS may exit initialization phase 705. If there are unprocessed starting point(s), the OSS may select a starting point that has not been processed for region expansion from the starting point(s) (block 714).

A region identification phase 717 may include the OSS performing a check to determine if there is at least one neighbor eNB that generates strong interference to the selected starting point as well as other eNBs in the already in the region (block 720). If there is at least one neighbor eNB that generates strong interference to the selected starting point (as well as other eNBs already in the region), the OSS may perform region expansion, e.g., the OSS may determine the region's neighbor eNB(s) (block 723) and add the neighbor eNB(s) to the region (block 726). The OSS may perform a check to determine if an average inter-cell interference of the region (which includes the newly added neighbor eNB(s)) exceeds the region identification threshold (block 729). If the average inter-cell interference of the region exceeds the region identification threshold, the OSS may continue region expansion with a next layer of neighbors (block 732). As an alternative to the use of average inter-cell interference of the region, it may be possible to use pair-wise inter-cell interference of eNBs of the region as a basis for region expansion. As another alternative, the inter-cell interference of subsets of eNBs of the region may be used as a basis of region expansion.

If the average inter-cell interference of the region (or the pair-wise inter-cell interference of the region or the subset-wise inter-cell interference of the region) does not exceed the region identification threshold, the OSS may stop region expansion (block 735). The OSS may perform a check to determine if region identification phase 717 may be repeated (block 738). If region identification phase 717 is to be repeated, the OSS may return to block 708 to determine the starting point(s). If region identification phase 717 is not to be repeated, the OSS may return to block 711 to check if there are additional unprocessed starting point(s).

If there are no neighbor eNBs generating strong interference to the selected starting point as well as other eNBs already in the region (block 720), the OSS may stop region expansion (block 735). The OSS may perform a check to determine if region identification phase 717 may be repeated (block 738). If region identification phase 717 is to be repeated, the OSS may return to block 708 to determine the starting point(s). If region identification phase 717 is not to be repeated, the OSS may return to block 711 to check if there are additional unprocessed starting point(s).

If there are no additional unprocessed starting point(s) (block 711), the OSS may merge overlapping regions (if any) (block 741). The OSS may save information about the regions into a memory, provide the information to the eNBs in the regions, and the like (block 742). The operations shown in FIG. 7a may continue at point A of FIG. 7b.

Figure 7B:
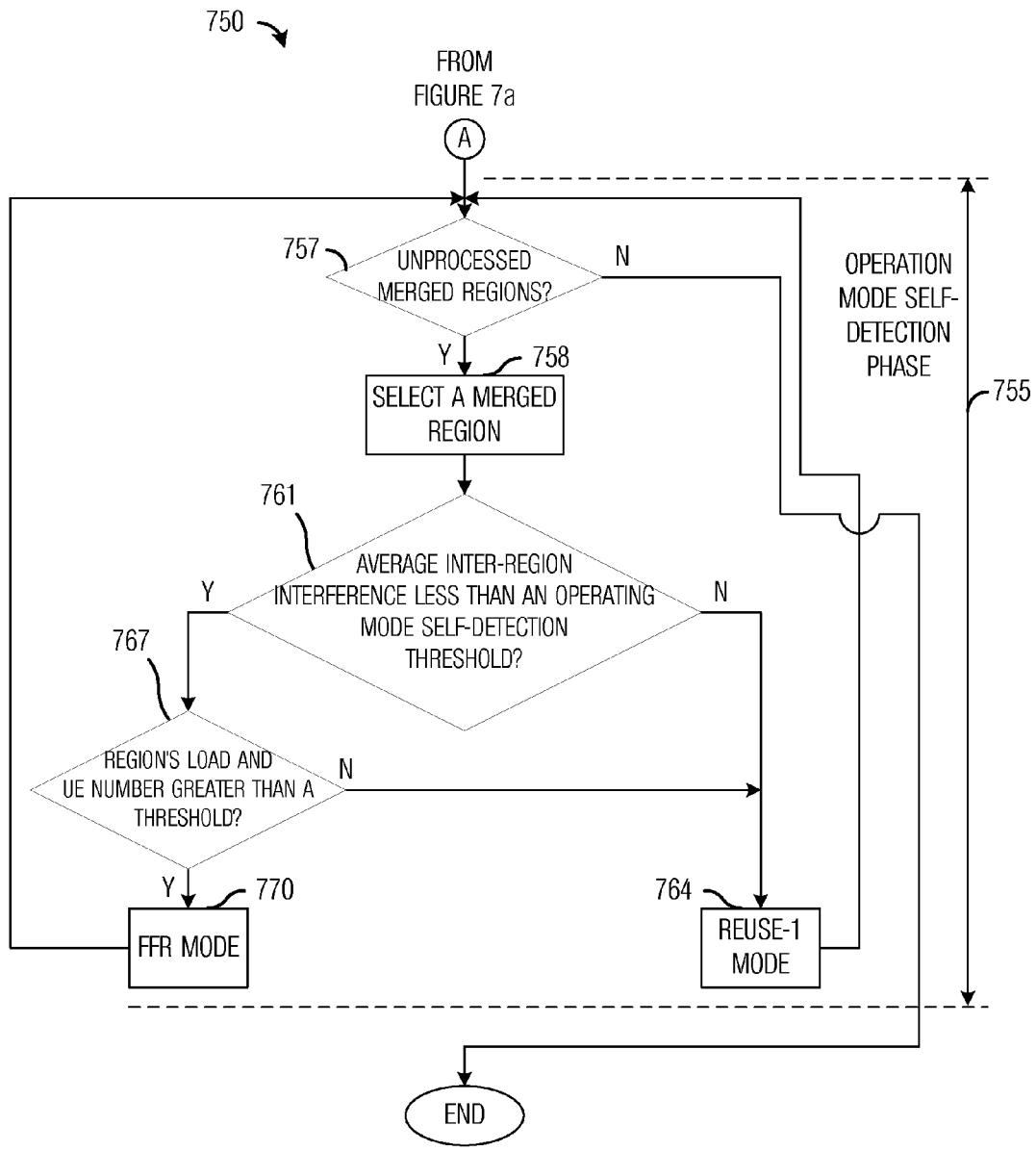
FIG. 7b illustrates an example flow diagram of detailed network device operations in operating mode determination for regions of a communications network, wherein an operating mode self-detection phase is highlighted according to example embodiments described herein.

FIG. 7b illustrates a flow diagram of detailed network device operations 750 in operating mode determination for regions of a communications network, wherein an operating mode self-detection phase is highlighted. Operations 750 may be indicative of operations occurring in an OSS, such as OSS 405, as the OSS determines the operating mode of regions of a communications network. Although the discussion of FIG. 7b focuses on the OSS performing the operations involved in the determination of the operating mode of regions in the communications network, the operations may also be performed in another network device in the communications network, such as an eNB, or in a combination of network devices, such as an OSS and an eNB.

An operation mode self-detection phase 755 may include the OSS performing a check to determine if there are any unprocessed merged region(s) (block 757). If there are unprocessed merged regions, then the OSS may select one of the unprocessed merged region(s) (block 758) and perform a check to determine if an average inter-region interference for the selected unprocessed merged region is less than the operating mode self-detection threshold (block 761). If the average inter-region interference for the selected unprocessed merged region is not less than the operating mode self-detection threshold, then the OSS may set the operating mode for the selected unprocessed merged region to Reuse-1 (block 764) and return to block 757 for any additional unprocessed merged regions.

If the average inter-region interference for the selected unprocessed merged region is less than the operating mode self-detection threshold (block 761), the OSS may perform a check to determine if a load of the selected unprocessed merged region and a number of UEs in the selected unprocessed merged region is greater than a threshold (block 767). The load of the selected unprocessed merged region and the number of UEs in the selected unprocessed merged region may be referred to as region level ICIC switch indicators. If the region level ICIC switch indicators do not meet the threshold, then the OSS may set the operating mode for the selected unprocessed merged region to Reuse-1 (block 764) and return to block 757 for any additional unprocessed merged regions. If the region level ICIC switch indicators do meet the threshold, then the OSS may set the operating mode for the selected unprocessed merged region to a FFR mode (block 770) and return to block 757 for any additional unprocessed merged regions.

Operating mode self-adaptation may be used to automatically identify a suitable operation mode for different eNBs in a communications network according to selection factors, including network topology, long term network traffic load, long term UE distribution, inter-cell interference levels, and the like. Operating mode self-adaptation may select one of several operating modes for each of the eNBs in the communications network. As an example, the operating modes may include: a) Reuse-1, which may be a basic, default operating mode; b) Self-organized and/or self-optimized ICIC, which may be a performance enhancing operating mode suitable for interference limited situations; and c) Uncoordinated downlink power control, which may be UE specific and may be a performance enhancing operating mode suitable for noise limited situations, especially when frequency selective scheduling is used.

FIG. 8 illustrates a flow diagram of network device operations 800 in operating mode self-adaptation. Operations 800 may be indicative of operations occurring in an OSS, such as OSS 405, as the OSS determines the operating mode self-adaptation for eNBs of a communications network. Although the discussion of FIG. 8 focuses on the OSS performing the operations involved in the operating mode self-adaptation, the operations may also be performed in another network device in the communications network, such as an eNB, or in a combination of network devices, such as an OSS and an eNB.

Operations 800 may begin with the OSS setting an initial operating mode for the eNBs in the communications network to a default operating mode (block 805). As an example, the OSS may set the operating mode for the eNBs to a Reuse-1 mode. The OSS may set the operating mode for all of the eNBs in the communications network or a subset of the eNBs in the communications network. As another example, the OSS may set the operating mode for the eNBs to a non-ICIC mode.

The OSS may also determine the status of network switch indicators (block 808). As discussed previously, examples of the network switch indicators may include long term communications network load, UE number, and the like. The OSS may perform a check to determine if the network switch indicators, e.g., the long term communications network load and the UE number, meet a network switch threshold (block 811). In general, the OSS may determine if the network switch indicators are enabled. If the network switch indicators do not meet the network switch threshold, then the OSS may continue with the operating mode of the eNBs of the communications network set to the default operating mode (block 814). The OSS may return to block 808 to wait until the network switch indicators are enabled.

If the network switch indicators are enabled, i.e., if the long term communications network load and the UE number meet the network switch threshold, the OSS may change from network level operation to region level operation. The OSS may perform operating mode identification of regions in the communications network (block 817). Operating mode identification, as performed by the OSS, for the regions in the communications network may make use of neighborhood average inter-cell interference levels.

Operating mode identification may include the OSS determining if there is any high interference regions detected in the communications network (block 820). If there are no high interference regions detected in the communications network, then for each region in the communications network, the OSS may perform a check to determine if an average inter-region interference level for a region is less than a noise limitation threshold, e.g., a fifth threshold $T_5$ (block 823). If the average interference level for the region is less than the noise limitation threshold, then the region may be a noise limited region and the OSS may set the operating mode of the region (and for eNBs in the region) to power control, e.g., downlink power control (block 826). If the average interference level for the region is not less than the noise limitation threshold, then the region may not be a noise limited region and the OSS may set the operating mode of the region (and for eNBs in the region) to Reuse-1 (block 829). The OSS may provide the operating mode of the region to eNBs in the region (block 830).

If there is a high interference region in the communications network (block 820), then for each region in the communications network may determine the nature of the region. As an example, the OSS may perform a check to determine if a region is a high interference region (block 832). As an alternative example, the OSS may perform a check to determine if a region is a low interference region.

If the region is not a high interference region (block 835), then the OSS may perform the check to determine if the average inter-region interference level for the region is less than noise limitation threshold, e.g., the fifth threshold $T_5$ (block 823). If the average interference level for the region is less than the noise limitation threshold, then the region is a noise limited region and the OSS may set the operating mode of the region (and for eNBs in the region) to power control, e.g., downlink power control (block 826). If the average interference level for the region is not less than the noise limitation threshold, then the region is not a noise limited region and the OSS may set the operating mode of the region (and for eNBs in the region) to Reuse-1 (block 829). The OSS may provide the operating mode of the region to eNBs in the region (block 830).

If the region is a high interference region (block 838), then the OSS may perform a check to determine if the average inter-region interference for the region is greater than the operating mode self-detection threshold, e.g., the fourth threshold $T_4$ (block 841). If the average inter-region interference for the region is not greater than the operating mode self-detection threshold, then the OSS may set the operating mode of the region (and for eNBs in the region) to Reuse-1 (block 844).

If the average inter-region interference for the region is greater than the operating mode self-detection threshold, then the OSS may perform an additional check to determine if region switch indicators are enabled by comparing the network switch indicators with a region switch threshold (block 847). Examples of the region switch indicators include region load, UE number, and the like. It is noted that the region switch indicators may be similar to network switch indicators discussed previously. However, the region switch indicators may be evaluated relative to the region under consideration and not the communications network. Region switch indicators include: i) a region-level load-based FFR switch indicator is an indicator that will be set to true if the number of non-lightly loaded eNBs in the region under consideration is above a pre-defined threshold; and b) a region-level UE number based FFR switch indicator is an indicator that will be set to true if the number of dense eNBs in the region under consideration is above a pre-defined threshold. If the region switch indicators are not enabled, e.g., the region switch indicators are not greater than the region switch threshold, then the OSS may set the operating mode of the region (and for eNBs in the region) to Reuse-1 (block 844). If the region switch indicators are enabled, e.g., the region switch indicators are greater than the region switch threshold, then the OSS may set the operating mode of the region (and for eNBs in the region) to FFR (block 850). The OSS may provide the operating mode of the region to eNBs in the region (block 830).

Figure 9:
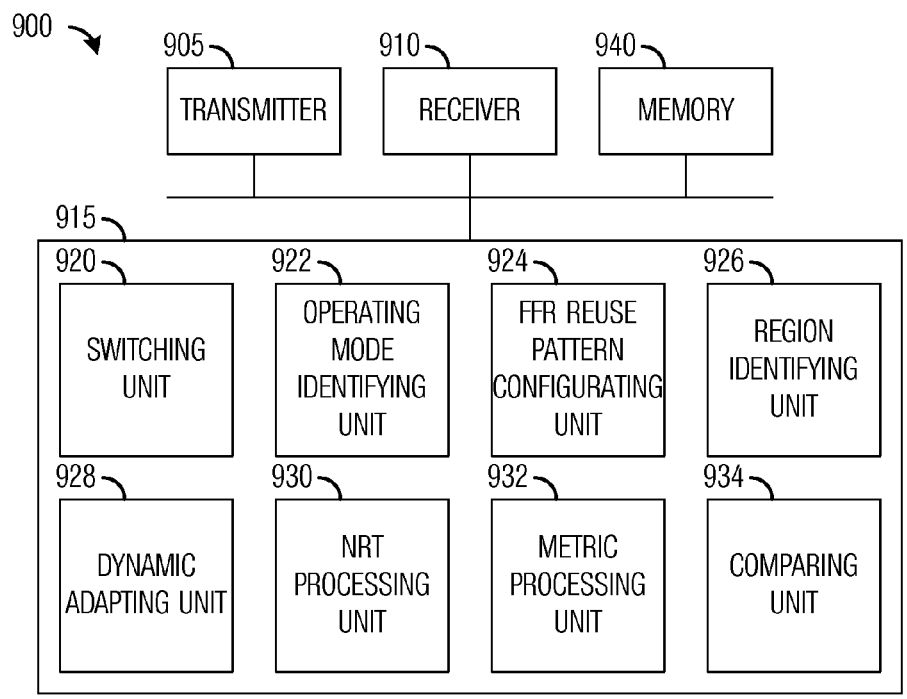
FIG. 9 illustrates an example first communications device according to example embodiments described herein.

FIG. 9 illustrates a diagram of a first communications device 900. Communications device 900 may be an implementation of a network device, such as an OSS, an eNB, a base station, a controller, and the like, of a communications network. Communications device 900 may be used to implement various ones of the embodiments discussed herein. As shown in FIG. 9, a transmitter 905 is configured to send messages, information, beacons, and the like, and a receiver 910 is configured to receive messages, information, beacons, and the like. Transmitter 905 and receiver 910 may have a wireless interface, a wireline interface, or a combination thereof.

A switching unit 920 is configured to set a status of a network switch indicator and/or a region switch indicator. Switching unit 920 is also configured to determine a status of a network switch indicator and/or a region switch indicator. An operating mode identifying unit 922 is configured to identify (specify) an operating mode of a region in the communications network. Operating mode identifying unit 922 is configured to identify (specify) the operating mode of the region according to a characterization of the region, e.g., an interference environment of the region. A FFR reuse pattern configuration unit 924 is configured to determine a FFR reuse pattern for a region that has been identified (specified) to operate in an FFR mode. A region identifying unit 926 is configured to partition the communications network into regions. Region identifying unit 926 is configured to partition the communications network into regions using a region identification algorithm, such as the example region identification algorithms described herein.

A dynamic adapting unit 928 is configured to adjust the operating mode for the regions in the communications network according to changes in the communications network. As an example, the changes in the communications network may be indicated by key performance indicators reported by entities, such as eNBs, in the communications network. A NRT processing unit 930 is configured to generate a NRT according to reports, such as RSRP reports, received from entities, such as eNBs, in the communications network. NRT processing unit 930 is also configured to update the NRT as additional reports are received from the entities. A metric processing unit 932 is configured to process interference metrics, such as inter-cell interference, average inter-cell interference, inter-region interference, average inter-region interference, and the like, of eNBs and regions in the communications network. A comparing unit 934 is configured to compare the interference metrics with threshold(s) to determine if the interference metrics meet the threshold(s). A memory 935 is configured to store reports, interference metrics, threshold(s), region information, operating mode assignments, FFR reuse patterns, NRTs, network switch indicators, region switch indicators, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while switching unit 920, operating mode identifying unit 922, FFR reuse pattern configuring unit 924, region identifying unit 926, dynamic adapting unit 928, NRT processing unit 930, metric processing unit 932, and comparing unit 934 may be software modules executing in a processor 915, such as a microprocessor, a digital signal processor, a custom circuit, and the like, or a custom compiled logic array of a field programmable logic array.

Figure 10:
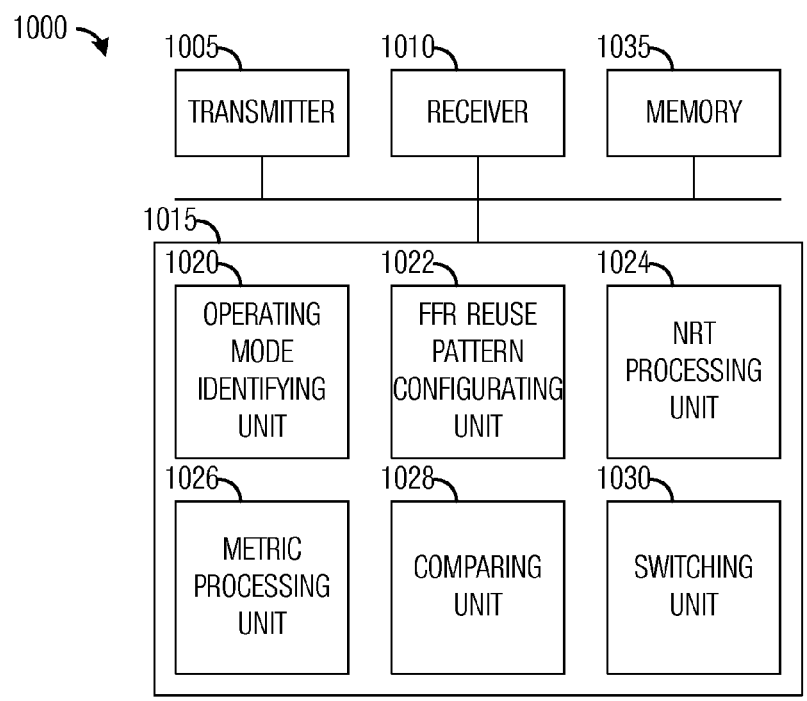
FIG. 10 illustrates an example second communications device according to example embodiments described herein.

FIG. 10 illustrates a diagram of a communications device 1000. Communications device 1000 may be an implementation of a network device, such as an OSS, an eNB, a base station, a controller, and the like, of a communications network. Communications device 1000 may be used to implement various ones of the embodiments discussed herein. As shown in FIG. 10, a transmitter 1005 is configured to send messages, information, beacons, and the like, and a receiver 1010 is configured to receive messages, information, beacons, and the like. Transmitter 1005 and receiver 1010 may have a wireless interface, a wireline interface, or a combination thereof.

An operating mode identifying unit 1020 is configured to identify (specify) an operating mode of a region in the communications network. Operating mode identifying unit 1020 is configured to identify (specify) the operating mode of the region according to a characterization of the region, e.g., an interference environment of the region. A FFR reuse pattern configuration unit 1022 is configured to determine a FFR reuse pattern for a region that has been identified (specified) to operate in an FFR mode. A NRT processing unit 1024 is configured to generate a NRT according to reports, such as RSRP reports, received from entities, such as eNBs, in the communications network. NRT processing unit 1024 is also configured to update the NRT as additional reports are received from the entities.

A metric processing unit 1026 is configured to process interference metrics, such as inter-cell interference, average inter-cell interference, inter-region interference, average inter-region interference, and the like, of eNBs and regions in the communications network. A comparing unit 1028 is configured to compare the interference metrics with threshold(s) to determine if the interference metrics meet the threshold(s). A switching unit 1030 is configured to set a status of a network switch indicator and/or a region switch indicator. Switching unit 1030 is also configured to determine a status of a network switch indicator and/or a region switch indicator. A memory 1035 is configured to store reports, interference metrics, threshold(s), region information, operating mode assignments, FFR reuse patterns, NRTs, network switch indicators, region switch indicators, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while operating mode identifying unit 1020, FFR reuse pattern configuring unit 1022, NRT processing unit 1024, metric processing unit 1026, comparing unit 1028, and switching unit 1030 may be software modules executing in a processor 915, such as a microprocessor, a digital signal processor, a custom circuit, and the like, or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method for setting an operating mode of a region, the method comprising:
    identifying, by a network device, an interference classification of the region;
    setting, by the network device, the operating mode of the region according to the interference classification of the region, an inter-cell interference metric of the region, and an inter-region interference metric of the region, wherein the inter-region interference metric of the region includes an average inter-region interference level; and
    providing, by the network device, the operating mode of the region to a device in the region, wherein setting the operating mode comprises: setting the operating mode of the region to one of a non-interference coordinating operating mode and a power control operating mode according to the inter-cell interference metric of the region when the region is classified as noise limited region; and setting the operating mode of the region to one of the non-interference coordinating operating mode and an interference coordinating operating mode according to the inter-region interference metric of the region when the region is classified as an interference limited region.

2. The method of claim 1, wherein the interference classification of the region comprises one of a noise limited region and an interference limited region.

3. The method of claim 1, wherein the inter-cell interference metric of the region includes an average inter-cell interference level.

4. The method of claim 1, wherein the non-interference coordinating operating mode includes a Reuse-i operating mode.

5. The method of claim 1, wherein the power control operating mode includes a downlink power control operating mode.

6. The method of claim 1, wherein the interference coordinating operating mode includes one of a fractional frequency reuse operating mode and a soft frequency reuse mode.

7. The method of claim 1, further comprising setting the operating mode of the region to one of a non-interference coordinating operating mode and an interference coordinating operating mode according to the inter-region interference metric of the region and a region switch indicator of the region when the region is classified as an interference limited region.

8. The method of claim 1, wherein the network device comprises one of an Operations and Support System (OSS) and an evolved NodeB.

9. The method of claim 1, wherein the device comprises one of an evolved NodeB and a user equipment.

10. A network device comprising:
a processor configured to:
identify an interference classification of a region;
set an operating mode of the region according to the interference classification of the region, an inter-cell interference metric of the region, and an inter-region interference metric of the region, wherein the inter-region interference metric of the region includes an average inter-region interference level; and
provide the operating mode of the region to a device in the region, wherein setting the operating mode comprises: setting the operating mode of the region to one of a non-interference coordinating operating mode and a power control operating mode according to the inter-cell interference metric of the region when the region is classified as noise limited region; and setting the operating mode of the region to one of the non-interference coordinating operating mode and an interference coordinating operating mode according to the inter-region interference metric of the region when the region is classified as an interference limited region.

11. The network device of claim 10, wherein the non-interference coordinating operating mode includes a Reuse-1 operating mode.

12. The network device of claim 10, wherein the power control operating mode includes a downlink power control operating mode.

13. The network device of claim 10, wherein the interference coordinating operating mode includes one of a fractional frequency reuse operating mode and a soft frequency reuse mode.

14. The network device of claim 10, wherein the processor configured to set the operating mode of the region comprises the processor configured to set the operating mode of the region to one of a non-interference coordinating operating mode and an interference coordinating operating mode according to the inter-region interference metric of the region and a region switch indicator of the region when the region is classified as an interference limited region.

15. The network device of claim 10, wherein the interference classification of the region comprises one of a noise limited region and an interference limited region.

16. The network device of claim 10, wherein the inter-cell interference metric of the region includes an average inter-cell interference level.

17. The network device of claim 10, wherein the device comprises one of an evolved NodeB and a user equipment.

18. The network device of claim 10, wherein the network device comprises one of an Operations and Support System (OSS) and an evolved NodeB.

19. A method for setting an operating mode of a region, the method comprising:
identifying, by a network device, an interference classification of the region;
setting, by the network device, the operating mode of the region according to the interference classification of the region, an inter-cell interference metric of the region, and an inter-region interference metric of the region, wherein the inter-cell interference metric of the region includes an average inter-cell interference level; and
providing, by the network device, the operating mode of the region to a device in the region, wherein setting the operating mode comprises: setting the operating mode of the region to one of a non-interference coordinating operating mode and a power control operating mode according to the inter-cell interference metric of the region when the region is classified as noise limited region; and setting the operating mode of the region to one of the non-interference coordinating operating mode and an interference coordinating operating mode according to the inter-region interference metric of the region when the region is classified as an interference limited region.

20. A network device comprising:
a processor configured to:
identify an interference classification of a region;
set an operating mode of the region according to the interference classification of the region, an inter-cell interference metric of the region, and an inter-region interference metric of the region, wherein the inter-cell interference metric of the region includes an average inter-cell interference level; and
provide the operating mode of the region to a device in the region, wherein setting the operating mode comprises: setting the operating mode of the region to one of a non-interference coordinating operating mode and a power control operating mode according to the inter-cell interference metric of the region when the region is classified as noise limited region; and setting the operating mode of the region to one of the non-interference coordinating operating mode and an interference coordinating operating mode according to the inter-region interference metric of the region when the region is classified as an interference limited region.

* * * * *